Sept. 9, 1930.  N. KJELDSEN  1,775,466
AUTOMOBILE HOOD LOCK
Filed Dec. 31, 1928  2 Sheets-Sheet 1
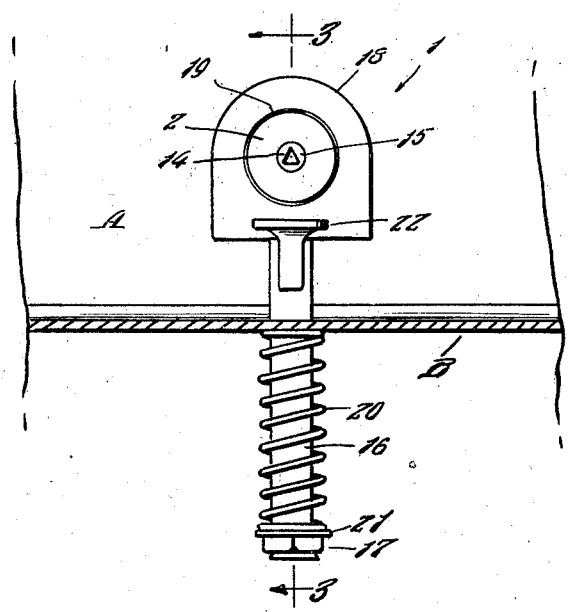
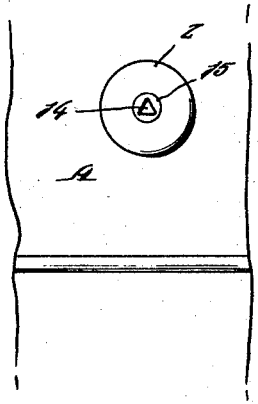
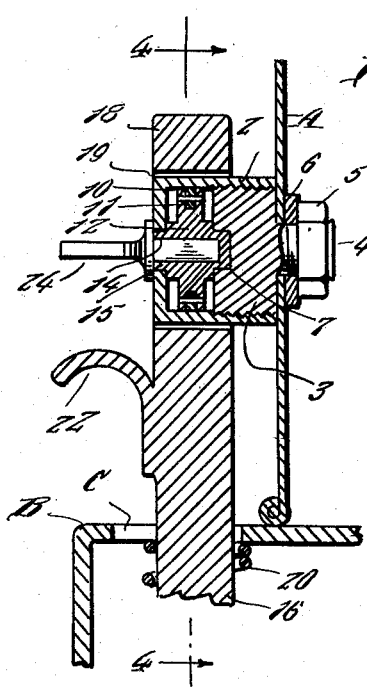
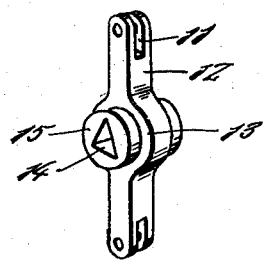
Inventor
Nels Kjeldsen
By Clarence A. O'Brien
Attorney Sept. 9, 1930.   N. KJELDSEN   1,775,466
AUTOMOBILE HOOD LOCK
Filed Dec. 31, 1928   2 Sheets-Sheet 2
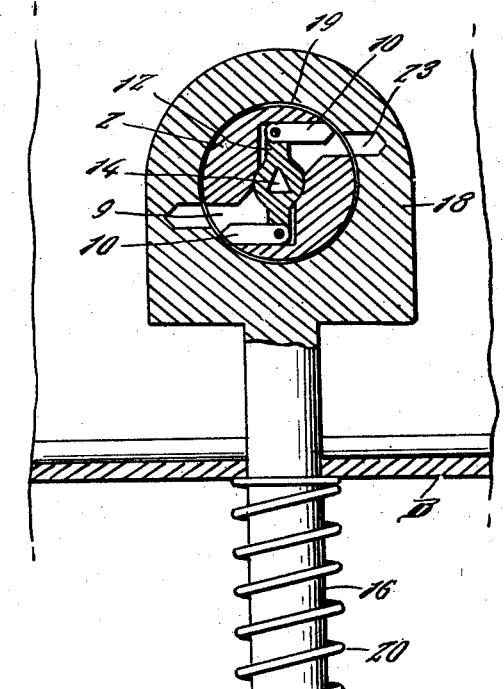
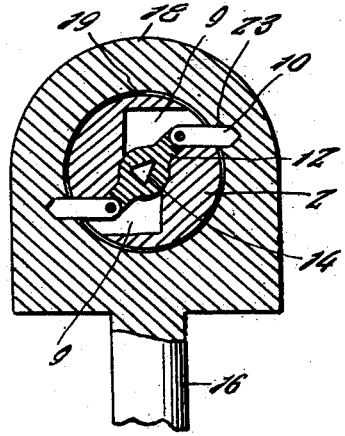
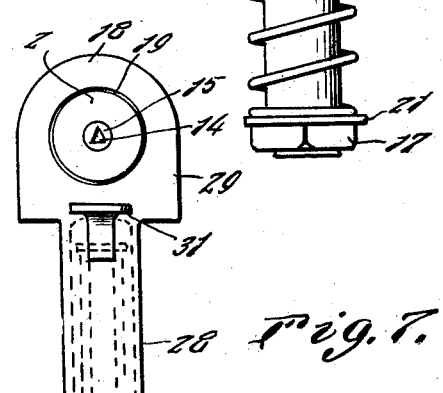
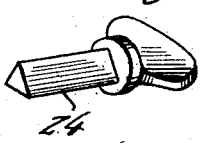
Inventor
*Nels Kjeldsen*
By *Clarence A. O'Brien*
Attorney Patented Sept. 9, 1930

1,775,466

UNITED STATES PATENT OFFICE

NELS KJELDSEN, OF LONGVIEW, WASHINGTON

AUTOMOBILE HOOD LOCK

Application filed December 31, 1928. Serial No. 329,391.

The present invention relates to impovements in locks and has reference more particularly to a device for locking the hood of an automobile or tractor in a closed position so that unauthorized persons cannot obtain access to the interior of the hood for the purpose of tampering with the motor, etc.

One of the important objects of the present invention is to provide an automobile hood lock of the above mentioned character that can be readily and easily installed without necessitating any alterations of the parts of the automobile with which the lock is adapted to be associated, the same being further at all times positive and efficient in its operation.

Still a further object is to provide an automobile hood lock of the above mentioned character wherein the same includes a spring pressed bolt that extends vertically through the frame of the automobile adjacent the hood, the upper end of the bolt being formed with an enlarged apertured head for disposition over the circular casing that is secured on the outer side of the hood, said apertured head and casing being formed with cooperating slots through which extend pivoted locking locks that are carried by the rotatable key actuated locking bar.

A further object is to provide an automobile hood lock of the above mentioned character that is simple in construction, inexpensive, strong and durable and further well adapted to the purposes for which it is designed.

Other objects and advantages will become apparent during the course of the following description.

In the accompanying drawing, forming a part of the specification, and in which like numerals indicate like parts throughout the same:

Figure 1 is a front elevation of the automobile hood lock embodying my invention, Figure 2 is an elevational view of the part of a lock that is associated with the automobile hood, Figure 3 is a vertical sectional view taken approximately on the line 3—3 of Figure 1 looking in the direction of the arrows, Figure 4 is a vertical sectional view taken approximately on the line 4—4 of Figure 3 looking in the direction of the arrows, Figure 5 is a similar section through the upper portion of the bolt showing the position of the lock when the rotatable locking bar is moved to one position whereby the hood is positively locked against being raised, Figure 6 is a detail perspective view of the key controlled locking bar, Figure 7 is a view similar to Figure 1, embodying a modification of the locking bolt and Figure 8 is a detail perspective view of the locking key employed in conjunction with the present automobile hood lock.

In the drawings, wherein for the purpose of illustration is shown the preferred embodiment of my invention, the numeral 1 designates generally my improved automobile hood lock, the same comprising a circular casing 2 that is open at its rear side and the rear end portion of the casing is internally threaded for receiving the threaded plug 3.

A threaded stem 4 projects rearwardly from the central portion of this plug 3 through an opening provided therefor in the side of the automobile hood A and a nut 5 is threaded on the outer end of the stem 4 to secure this portion of the lock rigidly on the automobile hood.

A washer 6 encircles the threaded stem 4 and is disposed between the inner face of the automobile hood A and the adjacent side of the nut 5 in a manner as more clearly disclosed in Figure 3. The front face of the plug 3 is formed with the centrally located socket 7, the purpose of which will presently be described.

Also the forward end of the casing 2 is provided with a centrally located circular shaped opening 8 for a purpose to be hereinafter more fully described. Upon referring to Figures 4 and 5 of the drawings it will be observed that the casing 2 is formed at opposed points with the lugs receiving pockets 9 that extend to the outer peripheral face of the casing for accommodating the locking lugs 10 that are pivoted at their inner ends in the respective bifurcated ends 11 of a locking bar 12 that is disposed vertically in the casing 2 between the front side and the plug 3.

This locking bar 12 is formed with an enlarged central portion 13 through which extends the triangular shaped bore 14. Reduced projections 15 are formed on opposite sides of the central enlarged portion 13 for disposition within the socket 7 and the circular opening 8 respectively to provide supporting means for the locking bar 12, which locking bar is capable of turning movement within the casing to a limited degree.

Forming an important part of the present invention is the bolt 16 that extends vertically through the horizontal portion B of the frame of the automobile, this portion B being formed with an elongated slot C to permit swinging movement of the bolt 16 as well as sliding movement thereof.

A nut 17 is threaded on the lower end of the bolt and formed on the upper end of this bolt is the enlarged head 18 that is formed with a circular opening 19 of a diameter slightly greater than that of the casing 2 so that said apertured head may be disposed over the casing as clearly shown in Figure 3.

A coil spring 20 encircles the bolt 16 and is disposed between the horizontal portion B of the frame and the washer 21 located on the lower end portion of the bolt 16.

This spring normally urges the bolt downwardly and a forwardly extending gripping finger 22 is formed on the front side of the upper portion of the bolt to facilitate actuation thereof.

The enlarged head 18 is formed at opposite points with the laterally disposed recesses 23 that communicate at their inner ends with the bore or opening 19 and furthermore communicates with the respective pockets 9 formed in the casing 2 as clearly shown in Figures 4 and 5.

A triangular shaped key such as shown at 24 in Figure 8 is employed for opening and closing my improved lock and when the parts are arranged as shown in Figure 4, the locking lugs 10 are confined entirely within the pockets 9 so that by lifting upwardly and forwardly on the hook shaped finger 22, the head 18 may be disengaged from the circular casing whereby to permit the raising of the hood.

However when the key 24 is inserted within the triangular shaped bore 14 of the locking bar 12, and said key is turned in one direction, the locking bar will also be turned so as to cause the locking lug to assume the position shown in Figure 5 whereupon said lug will enter the respective notches or recesses 23 and thereby positively secure the apertured head 18 on the casing 2 against disengagement therefrom.

By inserting the proper key in the locking bar and rotating the same back to the position shown in Figure 4, the lugs 10 are retracted from the recesses 23 into the pockets 9 whereby the head 18 of the bolt 16 may be readily and easily disengaged from the casing in an obvious manner.

In Figure 7 of the drawings, there is shown a modification of the bolt wherein the same includes a rod 25 that is formed at its lower end with laterally extending pintles 26 for disposition within suitable apertured ears 27 projecting upwardly from the frame whereby said rod is pivotally mounted on the frame. This rod extends upwardly into a hollow stem 28 which then carries at its upper end the enlarged apertured ear 29 for disposition over the circular casing 2.

A spring 30 is arranged within the hollow stem and the same encircles the rod 25 for the purpose of normally engaging the hollow stem downwardly on the rod and a finger engaging hook 31 is formed on the upper portion of the hollow stem.

It will thus be seen from the foregoing description, that I have provided an automobile hood lock that may be readily and easily installed and will not mar the appearance of the automobile when applied.

Furthermore said lock will at all times be positive and efficient in carrying out the purposes for which it is designed that will absolutely prevent any unauthorized person from gaining access to the interior of the hood and tampering with the motor or other parts under the hood.

While I have shown the preferred embodiment of my invention, it is to be understood that various changes in the size, shape and arrangement of parts may be resorted to without departing from the spirit of the invention and the scope of the appended claims.

Having thus described my invention, what I claim as new is:

1. In a device of the class described, the combination with the hood and frame of an automobile, of locking means for the hood comprising a unit fixedly secured on the outer side of the hood, a vertically extending bolt carried by the frame, an enlarged head formed on the upper end of the bolt and provided with an opening to accommodate said unit, said head being formed with opposed notches communicating at their inner ends with the openings formed in the head, and key control means arranged within the unit for disposition within said notches to positively secure the head on the unit against disengagement therefrom, said bolt being adapted for vertical and swinging movement, and spring means associated with the bolt for normally urging the same downwardly.

2. In a device of the class described, the combination with the hood and frame of an automobile; means for locking the hood comprising a unit secured in a fixed manner on the outer face of the side of the hood, a key controlled locking element arranged for turning movement within the unit, said unit being formed with a pocket that terminates at the outer face of the unit, a locking lug carried by the key control element for disposition within the pocket, a vertically extending bolt carried by the frame, an enlarged apertured head formed on the upper end of the bolt and adapted to encircle said unit, said apertured head being formed with the recess that communicates with the bore of the head for communication with said pocket, said locking lug adapted to enter the recess when the key control locking element is actuated in one direction to positively secure the apertured head on the unit against displacement therefrom.

3. In a device of the class described, the combination with the hood and frame of an automobile; means for locking the hood comprising a unit secured in a fixed manner on the outer face of the side of the hood, a key controlled locking element arranged for turning movement within the unit, said unit being formed with a pocket that terminates at the outer face of the unit, a locking lug carried by the key control element for disposition within the pocket, a vertically extending bolt carried by the frame, an enlarged apertured head formed on the upper end of the bolt and adapted to encircle said unit, said apertured head being formed with the recess that communicates with the bore of the head for communication with said pocket, said locking lugs adapted to enter the recess when the key control locking element is actuated in one direction to positively secure the apertured head on the unit against displacement therefrom, of vertical sliding and swinging movement.

4. In an automobile hood lock, an externally threaded plug having a rearwardly disposed threaded stem adapted to be inserted through an opening in the side of an automobile hood, securing means on the end of the said stem, a circular casing open at its rear side and being threadedly engaged with the said plug so that its closed end is disposed in spaced relation to the adjacent face of the said plug to provide a compartment therebetween, said casing being formed at opposite points with lug receiving pockets extending to the outer peripheral face of the casing, a centrally pivoted locking bar disposed in the compartment between the spaced portions of the casing, and the spaced portions of the casing plug, said plug being suitably supported in bearings in the said portions, said bar having a triangular shaped bore, a locking lug pivotally connected to the outer end of the said locking bar, said lugs being adapted upon the rotation of the locking bar in one direction to project beyond the lug receiving socket of the casing and upon rotation of bar in the reverse direction to be withdrawn entirely within the casing, and a keeper adapted to be pivotally mounted on the frame of an automobile for swinging movement in the direction of the said casing, said keeper presenting an enlarged head having a circular opening of slightly greater diameter than that of the casing to permit the head to be disposed over the latter, said enlarged head having laterally disposed recesses communicating with the pockets of the casing for receiving the projected lugs.

In testimony whereof I affix my signature.

NELS KJELDSEN.